United States Patent [19]
Stefko et al.

[11] Patent Number: 5,737,377
[45] Date of Patent: Apr. 7, 1998

[54] NUCLEAR REACTOR CAMERA MAST ASSEMBLY AND LOADING GUIDE

[75] Inventors: David J. Stefko, Jeannette; Robert M. Blumstein, Hempfield; Robert E. Meuschke, Monroeville; William J. Smoody, North Huntingdon; John A. Klimek, Oakdale; Edward H. Smith, Brave, all of Pa.

[73] Assignee: Westinghouse Electric Corporation, Pittsburgh, Pa.

[21] Appl. No.: 596,961

[22] Filed: Feb. 5, 1996

Related U.S. Application Data

[63] Continuation-in-part of Ser. No. 96,316, Jul. 23, 1993, Pat. No. 5,490,185.

[51] Int. Cl.$^6$ ............................ G21C 19/20; G21C 17/06
[52] U.S. Cl. ........................................ 376/268; 376/248
[58] Field of Search .................................. 376/248, 264, 376/268, 271

[56] References Cited

U.S. PATENT DOCUMENTS

| | | | |
|---|---|---|---|
| 4,308,100 | 12/1981 | Albin | 376/271 |
| 4,311,557 | 1/1982 | Kowalski et al. | 376/271 |
| 4,374,801 | 2/1983 | Albin | 376/268 |
| 4,482,520 | 11/1984 | Randazza | 376/248 |
| 4,643,867 | 2/1987 | Hornak et al. | 376/248 |
| 4,650,634 | 3/1987 | Meuschke et al. | 376/248 |
| 4,788,028 | 11/1988 | Leclerco et al. | 376/264 |
| 4,929,413 | 5/1990 | Kaufmann et al. | 376/268 |
| 5,028,379 | 7/1991 | Faulstich | 376/248 |
| 5,305,356 | 4/1994 | Brooks et al. | 376/249 |
| 5,526,384 | 6/1996 | Joly | 376/271 |
| 5,586,158 | 12/1996 | Iwama et al. | 376/268 |

*Primary Examiner*—Daniel D. Wasil

[57] ABSTRACT

A camera mast system permits remote inspection of nuclear fuel assemblies and other components of nuclear reactors. The system includes a camera mast assembly mounted on a refueling mast which may be positioned over a selected fuel assembly in the reactor core. An extendable camera mast having a camera mounted thereon moves vertically with respect to a stationary camera mast and the refueling mast in order to allow for visual inspection of various components in the reactor core. The camera mast assembly preferably includes a video cable take-up mechanism for handling the camera video cable as the extendable camera mast is moved up and down. The camera mast assembly is preferably removably mounted on the refueling mast in order to aid in installation and removal. The removable mounting also allows the camera mast assembly to be used independently of the refueling mast. The camera mast assembly may optionally include an extendable fuel assembly guide mast including a guide member which facilitates placement of fuel assemblies within the reactor core. The extendable guide mast is preferably rotatably mounted on the refueling mast. In another embodiment, a guide mast assembly is mounted on the refueling mast, including an extendable guide mast having a fuel assembly guide member mounted thereon for aligning the fuel assemblies in the reactor core.

19 Claims, 9 Drawing Sheets

NUCLEAR REACTOR CAMERA MAST ASSEMBLY AND LOADING GUIDE

CROSS-REFERENCE TO RELATED APPLICATION

This application is a continuation-in-part of U.S. patent application Ser. No. 08/096,316 filed Jul. 23, 1993, now U.S. Pat. No. 5,490,185, which is incorporated by reference herein.

BACKGROUND OF THE INVENTION

1. Field of the Invention

The present invention relates generally to nuclear reactor facilities, and more particularly to a camera mast system which enables inspection of reactor fuel assemblies and surrounding areas. The invention also relates to a refueling machine guidance system including a guide member which facilitates placement of fuel assemblies within the reactor core.

2. Background Information

In conventional nuclear reactor plants, the reactor core fuel assemblies must be periodically moved in order to replace spent fuel with new fuel. In addition, partially spent fuel may be rearranged within the reactor core. Spent fuel assemblies are conventionally removed from the reactor core and replaced with new or fresh fuel assemblies by means of a refueling machine, which may be also used to rearrange partially spent fuel assemblies. Conventional refueling machines typically comprise a trolley movable along a horizontal plane on a track system disposed above the reactor core. A vertically disposed outer or stationary mast is fixed to the refueling machine trolley so as to be moveable therewith. A vertically movable inner mast or gripper tube may be co-axially disposed within the interior of the outer stationary mast. A gripper assembly is typically secured to the lower end of the refueling machine gripper tube. A conventional trolley-mounted refueling mast assembly is disclosed in U.S. Pat. No. 4,311,577, which is incorporated herein by reference.

In order to align the gripper assembly with a particular fuel assembly, the operator must have a clear and unobstructed view. However, since the operator is typically located a considerable distance away from the fuel assembly, and the reactor core cavity is entirely immersed in water, light refraction causes distortion and an apparent erroneous location of the fuel assemblies. In order to aid in refueling operations, underwater cameras have been used to more clearly view the reactor core area. Such cameras are typically attached to the lower end of the refueling mast near the gripper assembly. U.S. Pat. Nos. 4,643,867, 4,650,634, 4,929,413 and 5,028,379, which are incorporated herein by reference, disclose such systems wherein a camera is fixed to the lower end of the refueling mast.

While conventional refueling mast-mounted camera assemblies allow for visual inspection of the gripper assembly at the tip of the refueling mast, the ability to inspect other locations within the reactor core is severely limited. For example, in addition to viewing the gripper area at the bottom of the refueling mast, it would be desirable to inspect the entire length of the fuel assemblies, verify fuel assembly gaps, inspect other components, video map the core, and inspect debris.

During refueling of the reactor, the upper support of the fuel assemblies is removed so that refueling equipment can remove and replace the fuel assemblies. Due to radiation effects and thermal effects, the fuel assemblies have a tendency to bow, which makes them very difficult to load back into the core. Special devices have been developed to load these bowed fuel assemblies, but conventional techniques require skilled workers on the refueling machine. A need exists for an apparatus that will permit the loading of bowed fuel assemblies into the core remotely without the use of skilled operators in the containment area.

The present invention has been developed in view of the foregoing and to overcome other deficiencies of the prior art.

SUMMARY OF THE INVENTION

The present invention provides a camera mast system which permits remote inspection of nuclear fuel assemblies and other nuclear reactor components. The system includes a camera mast assembly mounted on a refueling mast which may be positioned over a selected fuel assembly in the reactor core. An extendable camera mast having a camera mounted thereon moves vertically with respect to the refueling mast in order to allow for visual inspection of various components in the reactor core. The camera mast assembly preferably includes a video cable take-up mechanism for handling the camera video cable as the extendable camera mast is moved up and down.

In one embodiment of the present invention, the camera mast assembly may include an extendable fuel assembly guide mast having a guide member which facilitates placement of fuel assemblies within the reactor core. In this embodiment, the extendable guide mast may be rotatably mounted around the outer periphery of the refueling mast in order to allow for movement of the guide member to different angular orientations in relation to the refueling mast. The use of the refueling guide mast in combination with the camera mast assembly facilitates the refueling operation while allowing for remote observation.

In another embodiment of the present invention, a guide mast assembly is mounted on the refueling mast. The guide mast assembly includes a guide member and an extendable guide mast which positions the guide member in the proper location for aligning the fuel assemblies in the reactor core during refueling operations.

An object of the present invention is to provide a novel system for remotely inspecting nuclear reactor fuel assemblies.

Another object of the present invention is provide an improved telescoping camera mast system for viewing fuel assemblies and other components in a nuclear reactor core.

Another object of the present invention is to provide an apparatus for inspecting a nuclear fuel vessel including a camera mast assembly mounted on a refueling mast. The camera mast assembly includes a stationary camera mast mounted on a peripheral surface of the refueling mast, and a telescoping camera mast having a camera secured thereto. The apparatus includes means for raising and lowering the telescoping camera mast.

Another object of the present invention is to provide a refueling machine guidance system including a telescoping camera mast and a movable fuel assembly guide member which is used to place fuel assemblies in the desired location within the reactor core while allowing visual observation of the refueling operation.

Another object of the present invention is to provide an apparatus for guiding the placement of fuel assemblies within a nuclear reactor core. The apparatus includes a guide mast assembly mounted on a refueling mast wherein the guide mast assembly comprises a stationary guide mast mounted on a peripheral surface of the fueling mast, and a telescoping guide mast having a fuel assembly guide member secured thereto. The apparatus includes means for raising and lowering the telescoping guide mast, and means for rotating the guide mast assembly to different angular positions around the refueling mast.

These and other objects of the present invention will become more readily apparent from the following description.

DETAILED DESCRIPTION OF THE PREFERRED EMBODIMENTS

Figure 1:
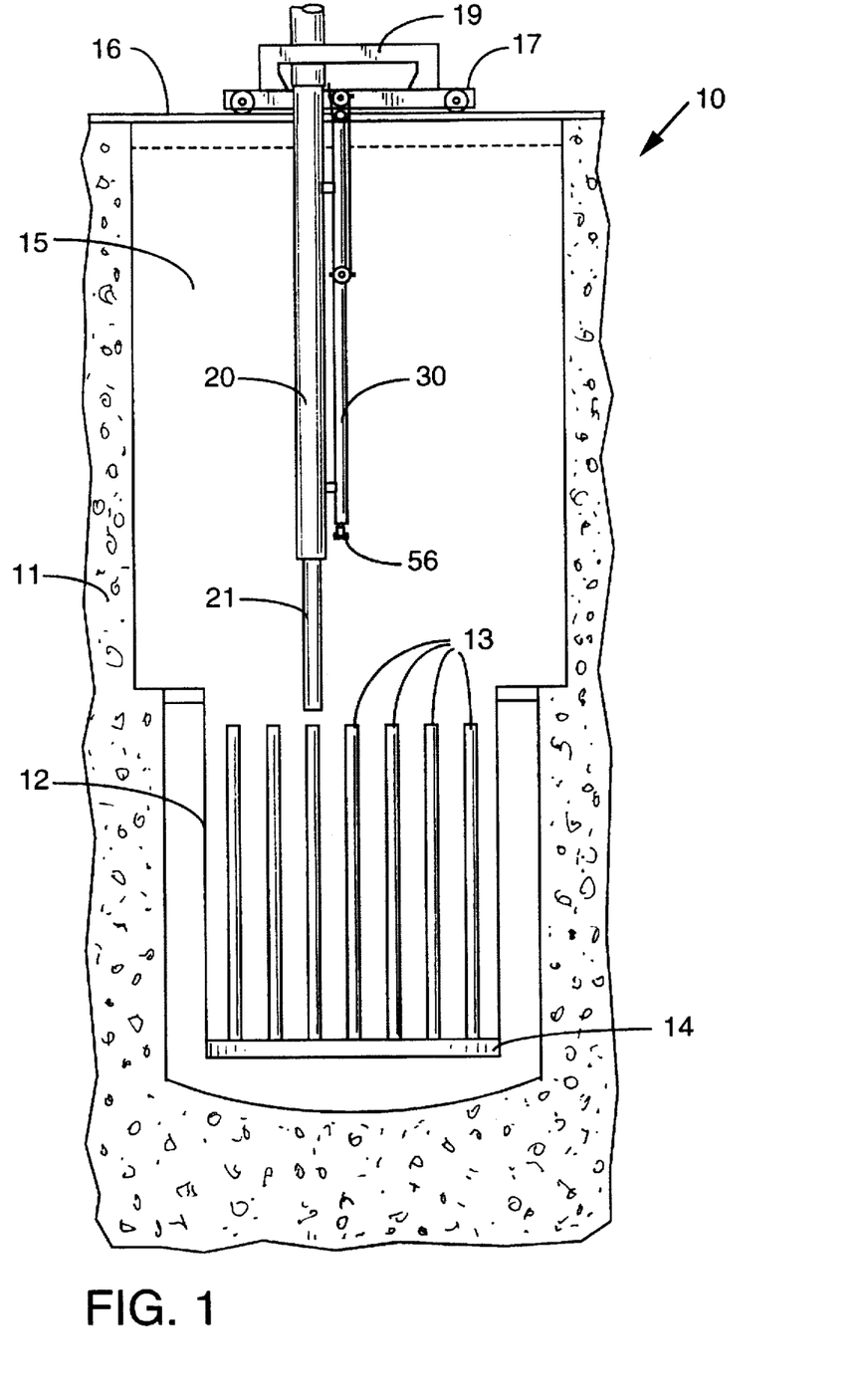
FIG. 1 is a generally schematic drawing of a nuclear reactor including a movable trolley having a refueling mast mounted thereon. A camera mast is mounted on the refueling mast in accordance with an embodiment of the present invention.

Referring to the figures, wherein like reference numerals represent like elements throughout the several drawings, FIG. 1 generally illustrates a nuclear reactor 10 including a reactor vessel 12 suspended in a reactor cavity in a concrete biological shield 11. The reactor core comprises several fuel assemblies 13 supported by a lower core plate 14 in the reactor vessel 12. The reactor vessel 12 may be supported within the nuclear reactor 10 by means of upper support members as shown in FIG. 1, or by lower support members (not shown). During refueling operations, the reactor is filled with water 15 to a level shown by the dashed line in FIG. 1 so that the assemblies can be transported under water. Trolley rails 16 span the reactor wall 11 over the water 15. A refueling trolley 17 is horizontally movable along the rails 16 and comprises a refueling mast support structure 19. As shown most clearly in FIG. 2, the trolley 17 includes wheels 18 for moving along the rails 16. A refueling mast 20 includes an outer portion attached to the support structure 19 of the trolley 17. An inner refueling mast 21 is co-axially disposed within the outer portion of the refueling mast 20, and is adapted to move vertically with respect thereto. A camera mast assembly 29 including a stationary Camera mast 30 is mounted on a peripheral surface of the refueling mast 20. A camera assembly 56 is supported by the camera mast 30, as more fully described below.

An extendable camera mast 31 is disposed co-axially within the stationary camera mast 30. While the extendable camera mast 31 shown in the figures is co-axially receivable inside the stationary camera mast 30, it is to be understood that the extendable camera mast 31 may alternatively be located externally of the stationary camera mast 30. Furthermore, the stationary camera mast 30 could be replaced with any other suitable support structure such as a rack. Thus, while the extendable camera mast 31 is primarily described herein as being telescopingly receivable within a tubular stationary mast 30, it is to be understood that other arrangements for mounting the extendable camera mast may be used. As shown in phantom in FIG. 2, the extendable camera mast 31 and camera assembly 56 may be moved vertically in relation to the stationary camera mast 30 and the refueling mast 20.

The camera mast assembly 29 includes a stationary pulley 40 and a movable pulley 41 carrying a video cable 50 which runs from the camera assembly 56 to an upper end 54 connected to a video receiver (not shown). The video cable 50 is reeved around the stationary and movable pulleys 40 and 41. The stationary pulley 40 and movable pulley 41 act to take-up the video cable when the telescoping camera mast is raised, as more fully described below. A slide track 42 is disposed on the outside of the stationary camera mast 30 and runs substantially parallel with the longitudinal axis of the stationary camera mast. When the telescoping camera mast and camera assembly is moved from the upper position to the lower position shown in phantom in FIG. 2, the movable pulley 41 slides along the track 42 from the lower position to the upper position shown in phantom in FIG. 2 to thereby play out the video cable. A winch 60 is used to raise and lower the extendable camera mast 31, as more fully described below.

Figure 2:
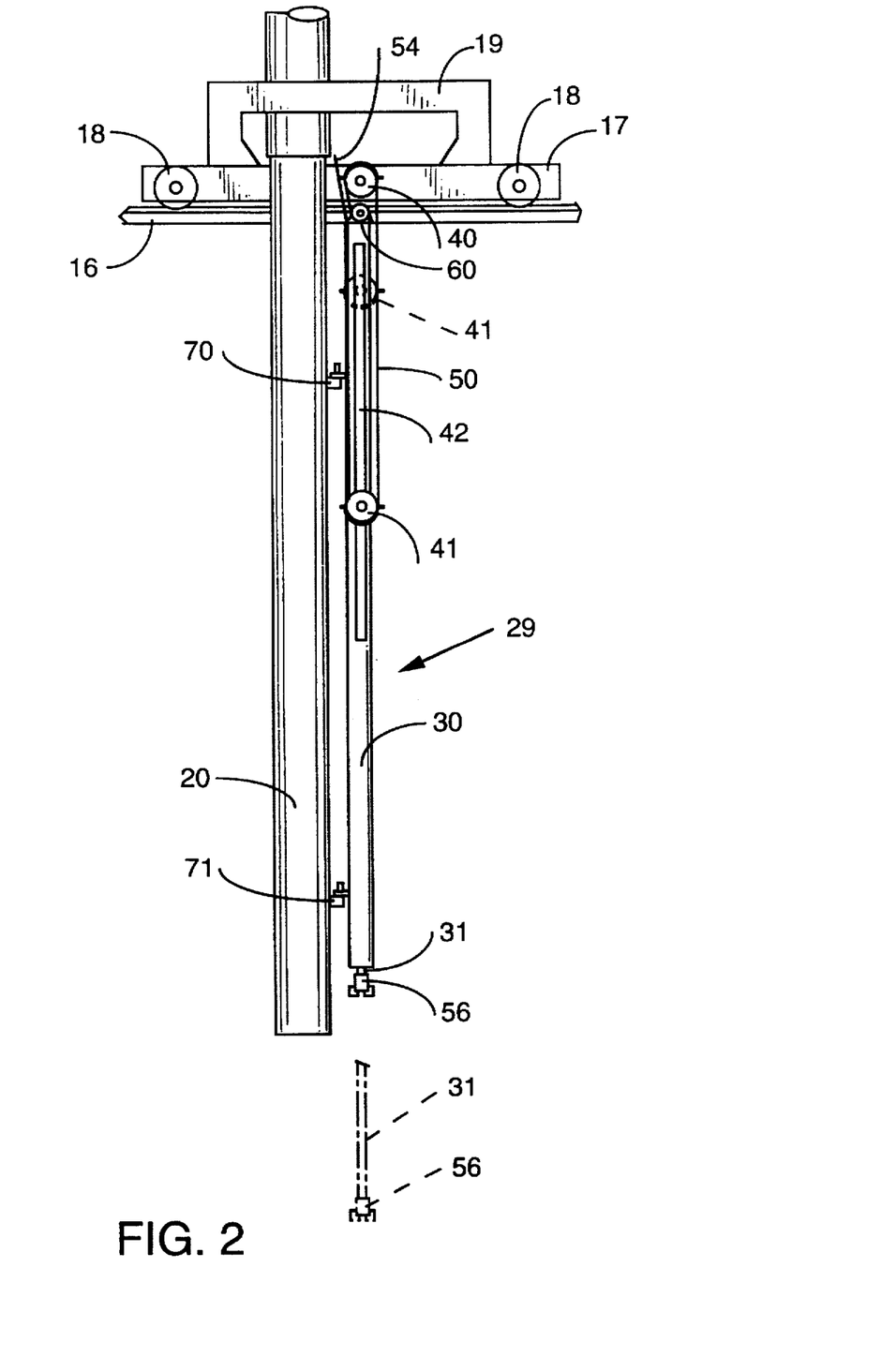
FIG. 2 is a partially schematic side view of a trolley-mounted refueling mast and camera mast assembly in accordance with an embodiment of the present invention.

In the embodiment shown in FIG. 2, the stationary camera mast 30 is removably mounted on the refueling mast 20 by means of upper and lower removable mountings 70 and 71. Thus, the camera mast assembly may be easily installed on the refueling mast, and removed from the refueling mast for repair or for independent use.

Figure 3:
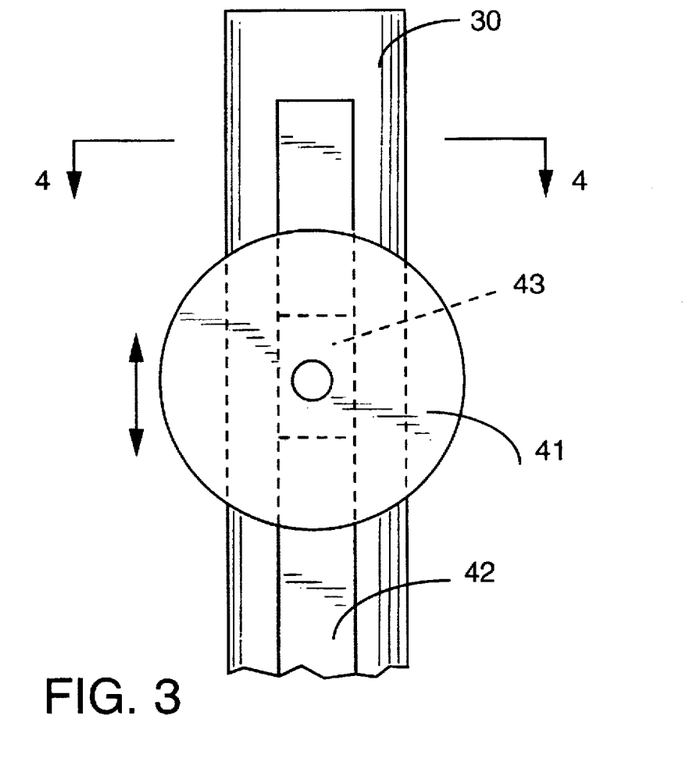
FIG. 3 is a partially schematic side view of a camera mast having a pulley assembly for taking up video cable in accordance with an embodiment of the present invention. The assembly includes a movable pulley slidably mounted on a track attached to the camera mast.
Figure 4:
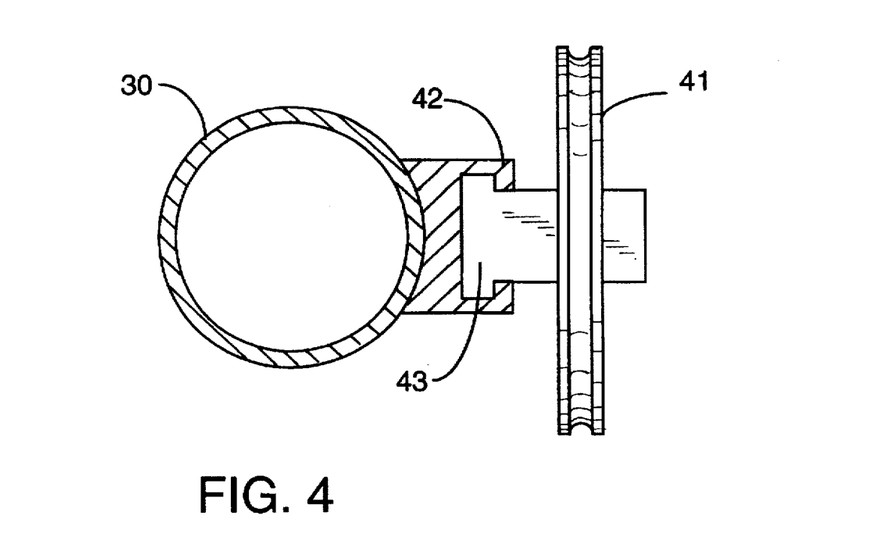
FIG. 4 is a partially schematic cross-sectional top view of the camera mast and track-mounted slidable pulley assembly of FIG. 3.

FIGS. 3 and 4 are partially schematic side and top views, respectively, of the slide mounting for the movable pulley 41. A slide track 42 is fastened to the stationary camera mast 30 by any suitable means such as bolts, rivets, welding and the like. As shown most clearly in FIG. 4, the slide track 42 comprises a channel having opposing lip portions which serve to retain the slide member 43 of the movable pulley 41. In order to reduce friction, the slide member 43 may be provided with ball or roller bearings (not shown) for contacting the slide track 42.

Figure 5:
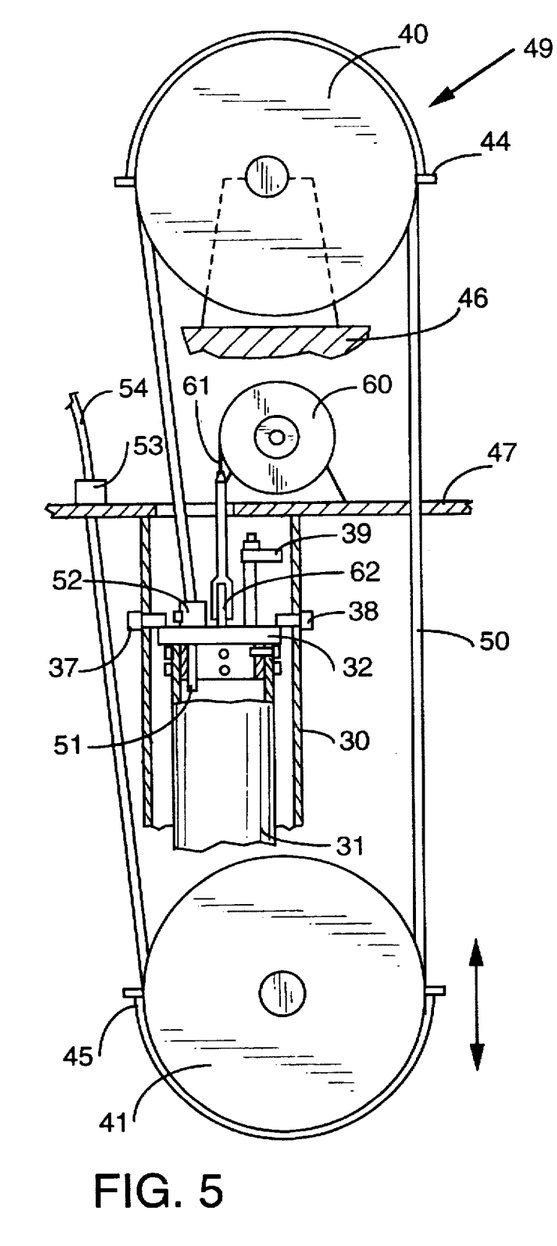
FIG. 5 is a partially schematic side view of a video cable take-up assembly and a camera mast lifting assembly in accordance with an embodiment of the present invention.

FIG. 5 shows additional details of the video cable take-up assembly 49 in accordance with a preferred embodiment of the present invention. The stationary pulley 40 may be rotatably attached to a stationary mounting 46 which is preferably fixed in relation to the stationary camera mast 30. For example, the stationary mounting 46 may be attached to the base 47 which, in turn, may be suspended from the refueling mast trolley. In a preferred embodiment, the stationary pulley 40 is mounted directly on the stationary camera mast 30 at the top thereof such that the stationary camera mast 30, stationary pulley 40, and movable pulley 41 are provided as a self-contained unit that can be supported by the refueling mast 20. The stationary pulley 40 and the movable pulley 41 are preferably provided with video cable guides 44 and 45, which help to retain the video cable 50 on the pulleys.

While other types of video cable handling mechanisms such as take-up reels may be used in accordance with the present invention, the sliding pulley configuration illustrated in FIG. 5 is particularly preferred because it reduces video signal degradation. For example, video cable take-up reels require the use of slip rings which degrade the video signal and are expensive. The sliding pulley take-up mechanism shown in FIG. 5 eliminates such problems by providing a simple system that expands to take-up the video cable, and which does not require slip ring connections in the video signal path.

As shown in FIG. 5, the video cable 50 comprises an end 51 which extends toward the camera assembly through the interior of the telescoping camera mast 31. The video cable extends through a cap 32 which is fastened to the upper end of the extendable camera mast 31 by any suitable means such as bolts, rivets, welding and the like. A stress relief fitting 52 on the cap 32 clamps the video cable. The video cable 50 extends from the stress relief fitting 52 up and around the stationary pulley 40, down and around the movable pulley 41, and up through the base 47, where it is clamped by another stress relief fitting 53. The portion of the video cable 54 extending from the stress relief fitting 53 runs to a video receiver (not shown).

Upper mechanical stops 37 and 38 extend through the wall of the stationary camera mast 30 and contact the cap 32 of the extendable camera mast 31 in order to limit the upward movement of the telescoping camera mast in relation to the stationary camera mast. The extendable camera mast 31 is also provided with a lower mechanical stop 39 which contacts a retaining member (not shown) located towards the bottom of the stationary camera mast 30.

In a preferred embodiment, an interlock is provided which prevents movement of the refueling machine trolley 17 if the extendable camera mast 31 is positioned below a preset limit. A bypass to this interlock may be provided which permits trolley movement with the telescoping camera mast extended during core verification. The mechanical stop 39 prevents the extendable camera mast 31 from being lowered beyond the tops of the fuel assembly top nozzles as installed in the core.

As shown in FIG. 5, a winch 60 supported by the base 47 includes a lift cable 61 which is attached by a fitting 62 to the cap 32 of the extendable camera mast 31. The winch 60 and cable 61 are used to raise and lower the telescoping camera mast 31 in relation to the stationary camera mast 30.

Figure 6:
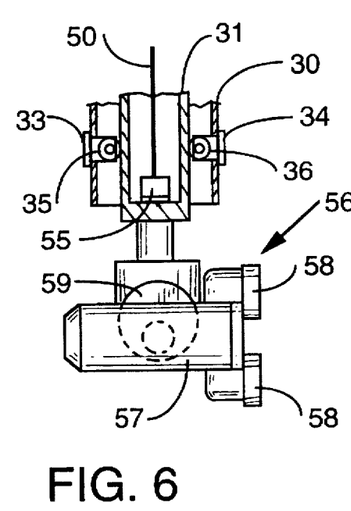
FIG. 6 is a longitudinal sectional view of a stationary camera mast having a telescoping inner camera mast coaxially mounted therein in accordance with an embodiment of the present invention. A camera and lighting assembly is mounted on the lower end of the telescoping inner mast.

FIG. 6 illustrates the lower portion of the stationary and extendable camera masts 30 and 31, and camera assembly 56, in accordance with a preferred embodiment of the present invention. Roller support members 33 and 34 extend through the wall of the stationary camera mast 30. Rollers 35 and 36 are rotatingly mounted on the support members 33 and 34, and contact the extendable camera mast 31. The rollers and support members serve to guide the extendable camera mast 31 as it travels within the stationary camera mast 30. Such rollers and support members may optionally be provided at suitable intervals along the stationary camera mast 30.

The camera assembly 56 is secured to the bottom portion of the extendable camera mast 31 by any suitable means such as bolts and the like. The camera assembly 56 includes a camera 57 which preferably has zoom capabilities and non-browning optics. Lights 58 provide illumination for the camera 57. The camera 57 is attached to the lower end of the extendable camera mast 31 by means of a pan/tilt unit 59 which preferably allows the camera to pan at least 330° and tilt downward at least 90° from the horizontal. In a more preferred embodiment, the pan/tilt unit 59 allows the camera to tilt at least 330°. The camera assembly 56 is preferably radiation tolerant, allowing it to be positioned near irradiated fuel assemblies. Furthermore, the camera 57 is preferably equipped with a remotely controllable zoom lens to permit inspection of the bottom core plate area when the fuel assemblies are removed from the reactor core. The camera, light casing and pan/tilt unit are fabricated from any suitable material, preferably 300 series stainless steel. The light system preferably includes two 50 watt, 120 volt AC lights. The camera 57 and lights 58 are preferably removable from the pan/tilt unit 59 in order to facilitate servicing and replacement.

In addition to carrying the video signal from the camera 57 to a video receiver, the video cable 50 preferably includes an electrical cable for supplying power to the camera 57, lights 58 and pan/tilt unit 59. An integrated camera control unit (not shown) is provided to control the camera 57, underwater lights 58, and pan/tilt unit 59. The control unit may be mounted in or on a refueling machine control console (not shown). A conventional control console monitor may be used to display the video image from the camera assembly. Preferably, video outputs are provided for connection to a video cassette recorder. The camera control unit is preferably powered by a 120 VAC 60 Hz power supply.

Figure 7:
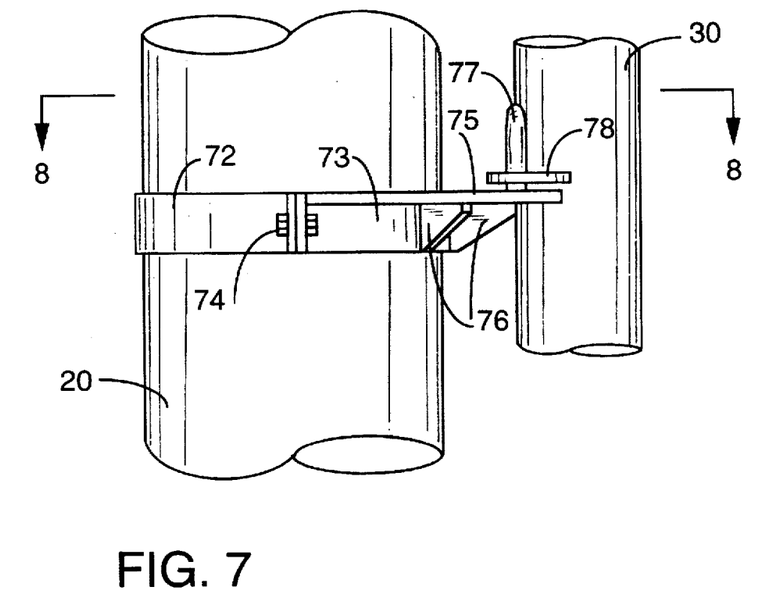
FIG. 7 is a partially schematic side view showing a mounting assembly for removably mounting a camera mast assembly to a refueling mast in accordance with an embodiment of the present invention.
Figure 8:
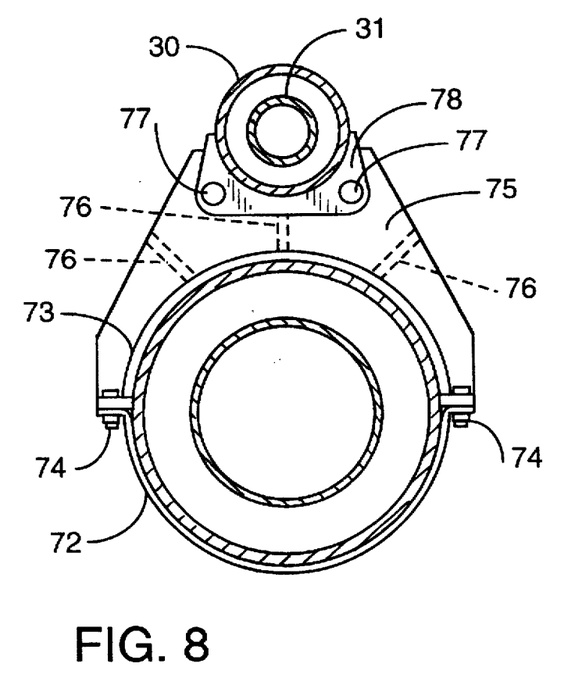
FIG. 8 is a partially schematic cross-sectional plan view of the mounting assembly shown in FIG. 7.

FIGS. 7 and 8 illustrate a removable mounting assembly for securing the stationary camera mast 30 to the refueling mast 20, in accordance with a preferred embodiment of the present invention. Two generally semi-circular clamps 72 and 73 are fastened around the outside of the refueling mast 20 by bolts 74 or any other suitable type of fastener. In this manner, the clamps 72 and 73 may be secured to the refueling mast 20 without the necessity of drilling or welding the refueling mast. The clamp 73 located closest to the stationary camera mast 30 includes a generally horizontal shelf 75 supported by support gussets 76. The shelf 75 includes two mounting pins 77 extending vertically upwards therefrom. While two mounting pins 77 are shown in FIGS. 7 and 8, one or more pins could alternatively be used. However, multiple pins are preferred in order to prevent unwanted swinging of the camera mast 30 in relation to the refueling mast 20. A mounting bracket 78 having holes for receiving the mounting pins 77 is fastened to the stationary camera mast 30. Both the upper removable mounting 70 and lower removable mounting 71 shown in FIG. 2 may be configured as shown in detail in FIGS. 7 and 8. These removable mountings allow the stationary camera mast 30 to be easily installed on the refueling mast 20, and easily removed for servicing or replacement. In addition, the removable mountings permit the stationary camera mast to be removed and used as a free-standing unit independently from the refueling mast 20.

The camera mast assembly of the present invention advantageously provides for visual inspection of the gripper assembly during refueling operations, as well other areas of the reactor core. Due to the ability of the telescoping camera mast to move in the vertical direction independently of the refueling mast, several different components may be inspected. For example, when the inner refueling mast 21 grips and raises a fuel assembly, the telescoping camera mast may be lowered in order to inspect the entire length of the elevated fuel assembly. The assembly may further be used to video map the core after installation of the fuel assemblies. The assembly may also be used to view the lower internal baffle gaps, lower core plate, fuel transfer system, guide pins, hot leg pipe and walls of the reactor vessel.

Figures 9, 10:
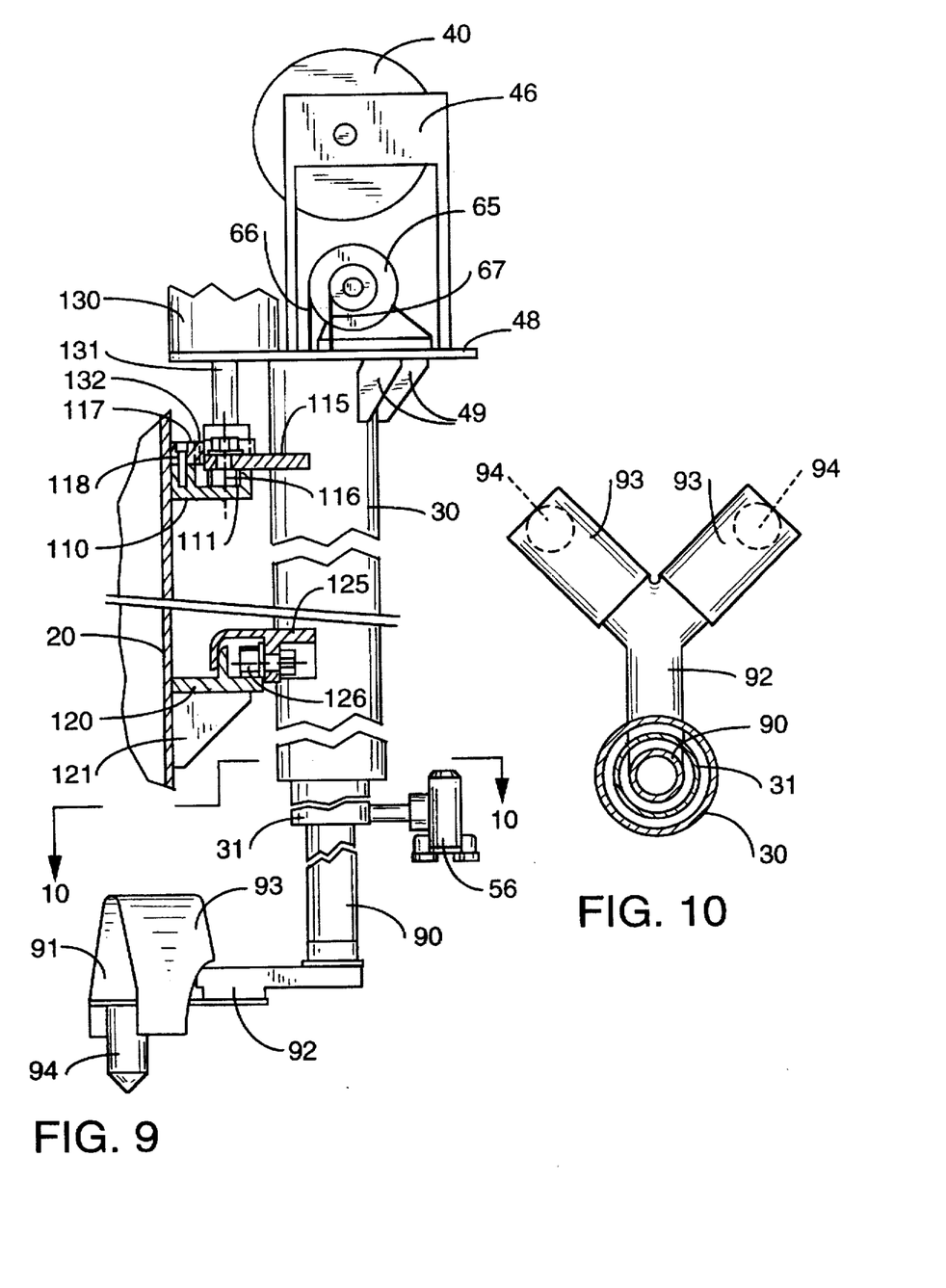
FIG. 9 is a partially schematic compressed side view of a mast assembly in accordance with an embodiment of the present invention, including a fuel assembly loading guide fastened to a telescoping mast which is coaxially mounted within the inner camera mast.
FIG. 10 is a cross-sectional top view of the loading guide assembly of FIG. 9, showing the co-axial arrangement of the telescoping guide mast and inner camera mast in accordance with an embodiment of the present invention.
Figure 11:
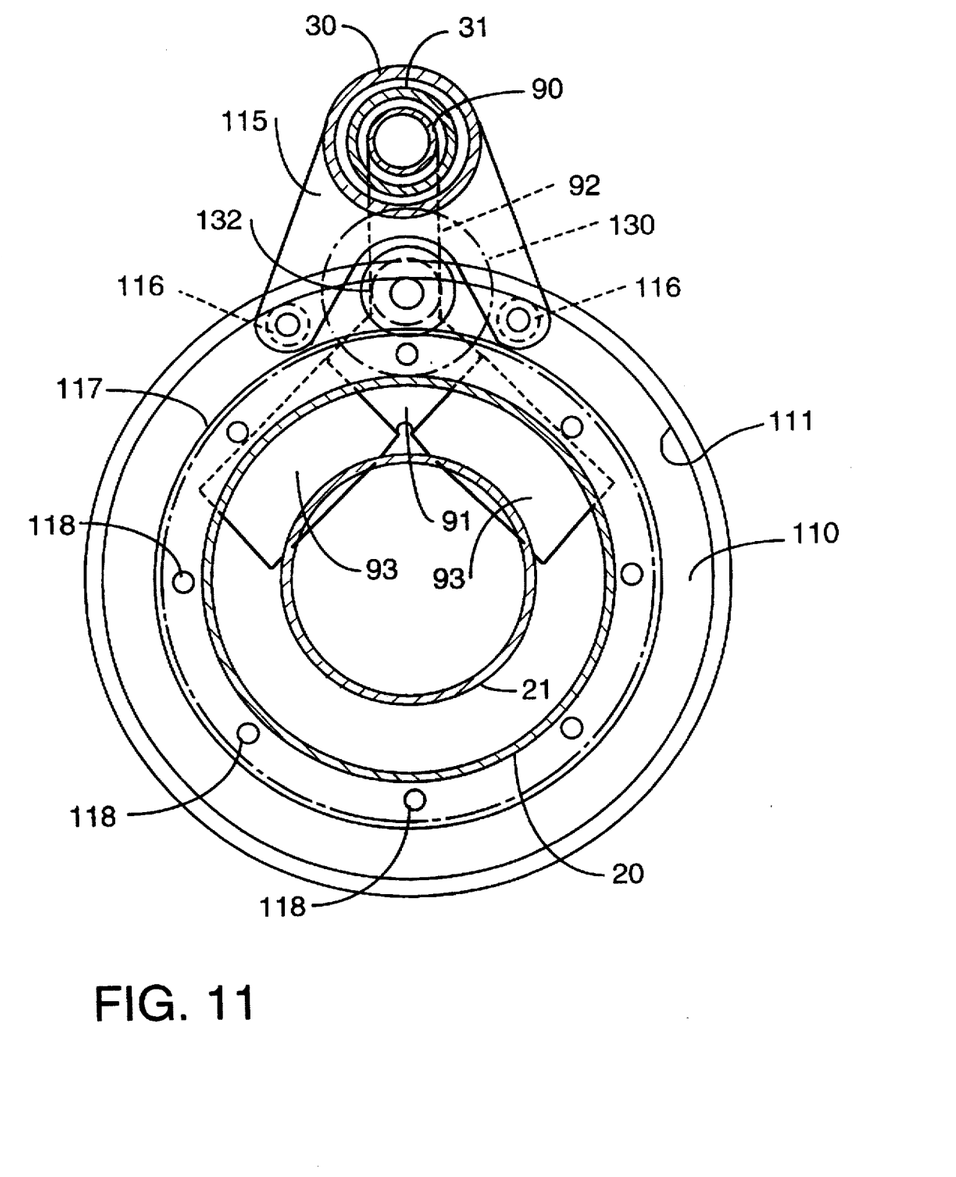
FIG. 11 is a partially schematic cross-sectional top view of a refueling mast having a loading guide mast rotatably mounted thereon in accordance with an embodiment of the present invention.

FIGS. 9–11 illustrate a mast assembly in accordance with an alternative embodiment of the present invention, including a fuel assembly loading guide fastened to a telescoping mast which is slidably mounted on the camera mast assembly. As shown in FIG. 9, the stationary camera mast 30 is mounted to a base 48 by means of gussets 49. A stationary pulley 40 as described previously is connected to the base 48 by means of a support bracket 46. An extendable camera mast 31 having a camera assembly 56 attached thereto is co-axially mounted within the stationary camera mast 30, as described previously. In addition, a loading guide mast 90 is co-axially mounted within the extendable camera mast 31 and stationary camera mast 30. The loading guide mast 90 is preferably telescopingly movable with respect to both the extendable camera mast 31 and the stationary camera mast 30. While the loading guide mast 90 is located co-axially inside the extendable camera mast 31 and stationary camera mast 30 in the figures, it is to be understood that the loading guide mast 90 may be slidably mounted on the exterior of the extendable camera mast 31 and/or the stationary camera mast 30 in accordance with the present invention. A loading guide member 91 is attached to the loading guide mast 90 by means of a guide support 92. The guide member 91 includes two generally inverted V-shaped guide surfaces 93 disposed at a 90 degree angle with respect to each other, as shown most clearly in FIG. 10. Guide pins 94 are provided below each of the guide surfaces 93 for engaging mating recesses in the core support plate of the nuclear reactor vessel. As discussed more fully below, the guide member acts as a "shoehorn" to facilitate placement of the fuel assemblies within the reactor core.

The loading guide mast 90, as well as the stationary camera mast 30 and extendable camera mast 31, are preferably rotatably mounted on the refueling mast 20 as shown in FIGS. 9 and 11. An upper mounting support 110 extends from an upper portion of the refueling mast 20 toward the stationary camera mast 30. The upper mounting support 110 includes a generally cylindrical roller bearing surface 111 which extends upwardly from the support 110 in the vertical direction shown in FIG. 9. An upper mounting bracket 115 is fastened to the stationary camera mast 30 by any suitable means such as bolts or wielding. An upper roller bearing 116, which is rotatably mounted on the upper mounting bracket 115, contacts the roller bearing surface 111 of the upper mounting support 110.

A lower mounting support 120 reinforced by a support member 121 extends from a lower portion of the refueling mast 20 toward the stationary camera mast 30. A lower mounting bracket 125, which is fastened to a lower portion of the stationary camera mast 30, extends toward the refueling mast 20. A lower roller bearing 126 is rotatably mounted on the lower mounting bracket 125. The lower roller bearing 126 rides on an upper surface of the lower mounting support 120 in order to carry the vertical load placed on the refueling mast 20 by the stationary camera mast 30 and accompanying equipment. As shown in FIG. 9, the lower mounting bracket 125 includes a downwardly extending portion adjacent to the refueling mast 20 which contacts an upwardly extending portion of the lower mounting support 120 in order to provide lateral containment of the stationary camera mast 30 against the refueling mast 20.

As shown most clearly in FIG. 9, a motor 130 supported by the base 48 is connected to a downwardly extending drive shaft 131. A drive gear 132 is connected to the lower portion of the drive shaft 131. The gear 132 drivingly engages an annular gear 117, which is connected to the upper mounting support 110 by means of fasteners 118.

As shown in FIGS. 9 and 11, the engagement of the drive gear 132 with the annular gear 117 of the upper mounting support 110 causes rotation of the loading guide mast 90 around the circumference of the refueling mast 20 upon actuation of the motor 130. In this manner, the loading guide mast 90, stationary camera mast 30 and extendable camera mast 31 may be positioned at different angular orientations around the circumference of the refueling mast 20.

As shown in FIG. 9, a winch 65 is used to raise and lower the extendable camera mast 31 by means of the lift cable 66. In addition, the winch 65 is used raise and lower the loading guide mast 90 by means of another lift cable 67. In order to provide independent movement of the extendable camera mast 31 and loading guide mast 90, the winch 65 may be provided with a suitable clutch mechanism (not shown) which allows the camera mast lift cable 66 and loading guide mast lift cable 67 to be reeled in and out separately frown each other.

Figure 12:
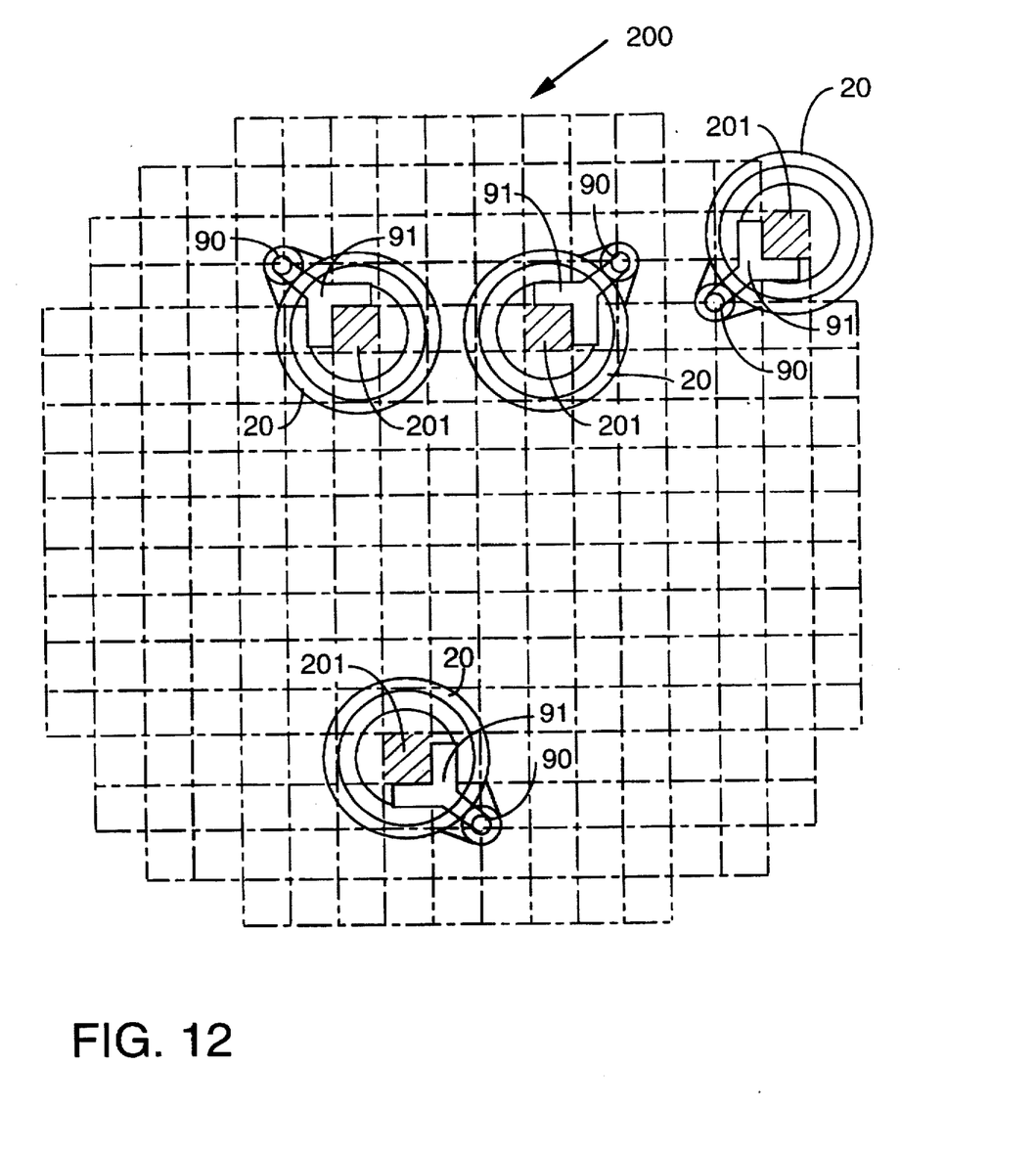
FIG. 12 is a schematic top view of a core assembly grid illustrating the operation of a refueling mast and rotatably mounted loading guide assembly in accordance with an embodiment of the present invention.

The operation of the rotatable loading guide assembly as shown in FIGS. 9–11 is schematically illustrated in FIG. 12. In accordance with known methods, the refueling mast 20 may be positioned at various locations above a fuel assembly grid 200 comprising a plurality of fuel assemblies 201. Due to constraints imposed by adjacent fuel assemblies and/or the reactor vessel container, it is advantageous to position the loading guide mast 90 and guide member 91 at different angular orientations. For example, for a fuel assembly 201 located in the upper right hand corner of the fuel assembly grid 200 shown in FIG. 12, the loading guide mast 90 may be positioned on the lower left hand side of the refueling mast 20 in order to avoid contact with the interior wall of the reactor vessel. Alternatively, the loading guide mast 90 and guide member 91 may be positioned in the other angular orientations with respect to the refueling mast 20, as shown in FIG. 12, in order to avoid contact with adjacent fuel assemblies.

Figure 13:
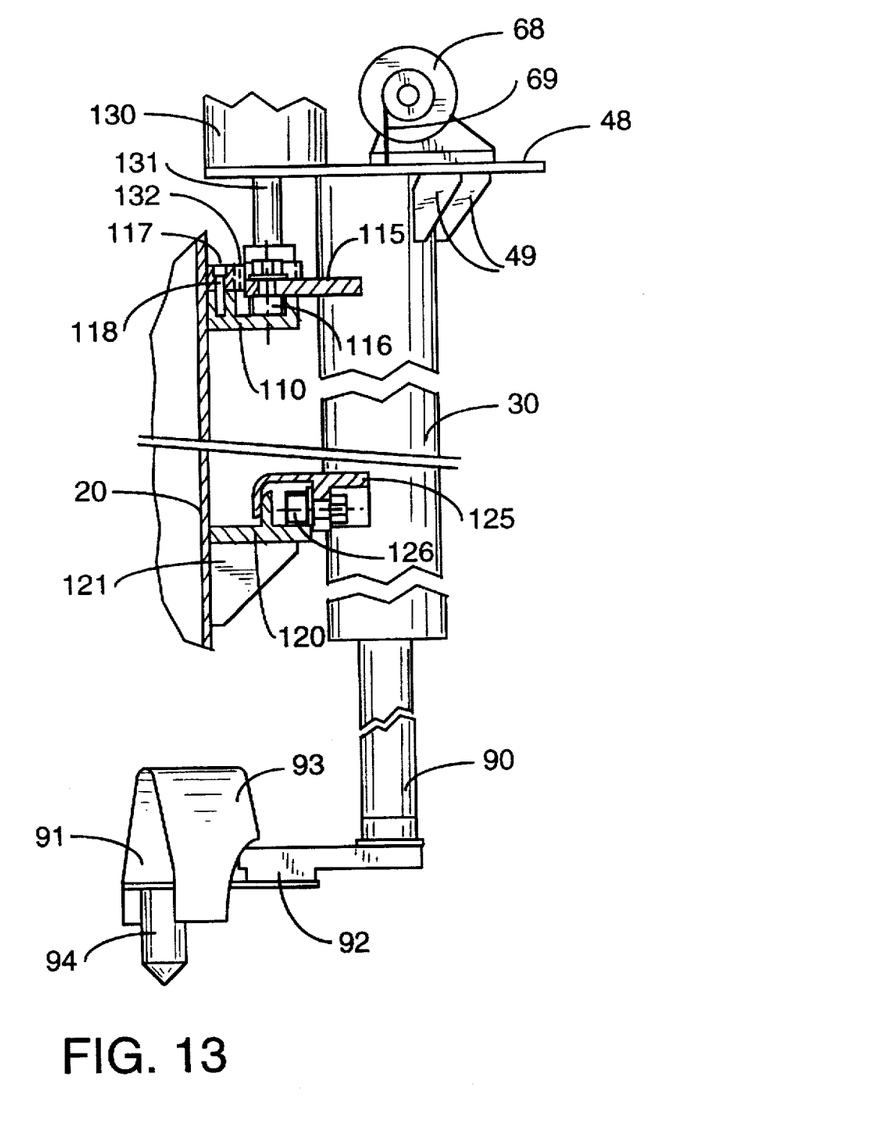
FIG. 13 is a partially schematic compressed side view of a mast assembly in accordance with an alternative embodiment of the present invention, including a fuel assembly loading guide attached to a telescoping inner guide mast which is coaxially mounted within an outer guide mast. The outer guide mast is rotatably mounted on the refueling mast.

FIG. 13 illustrates a loading guide mast assembly in accordance with an alternative embodiment of the present invention. The guide assembly shown in FIG. 13 is similar to the guide assembly of FIGS. 9–11, with the exception that the extendable camera mast 31 and camera assembly 56 are removed. Thus, the stationary mast 30, stationary pulley support bracket 46, winch 65 and motor 130 are secured to the base 48. The loading guide mast 90 is co-axially mounted within the stationary mast 30 and is telescopically movable with respect thereto. A loading guide member 91 having guide surfaces 93 is fastened to the loading guide mast 90 by means of a guide support 92. Guide pins 94 are preferably provided below each of the guide surfaces 93 for engagement with the core support plate.

The loading guide mast 90 and stationary mast 30 of FIG. 13 are rotatably mounted on the refueling mast 20 in the same manner as shown in FIGS. 9 and 11. Thus, actuation of the motor 130 causes rotation of the loading guide mast 90 around the circumference of the refueling mast 20. The loading guide mast 90 may therefore be positioned at different angular orientations, in the same manner as shown in FIG. 12.

While particular embodiments of the present invention have been described for purposes of illustration herein, it is to be understood that the above description of the present invention is susceptible to various modifications, changes, and adaptations by those skilled in the art, and that such modifications, changes and adaptations are to be considered to be within the spirit and scope of the invention as set forth by the appended claims.

We claim:

1. An apparatus for inspecting a nuclear reactor vessel comprising:

a refueling mast;

a camera mast assembly removably mounted on a peripheral surface of the refueling mast comprising an extendable camera mast;

a camera supported by the extendable camera mast; and means for raising and lowering the extendable camera mast.

2. The apparatus of claim 1, wherein the camera mast assembly comprises a stationary camera mast mounted on the peripheral surface of the refueling mast.

3. The apparatus of claim 2, wherein the extendable camera mast is mounted co-axially within the stationary camera mast.

4. The apparatus of claim 1, wherein the camera mast assembly is rotatably mounted around the refueling mast.

5. The apparatus of claim 1, further comprising:

a video cable connected to the camera for transmitting video signals from the camera; and means for taking up the video cable when the extendable camera mast is raised.

6. The apparatus of claim 5, wherein the means for taking up the video cable comprises means for providing the video cable with an uninterrupted video signal path which reduces loss of video signals from the camera.

7. The apparatus of claim 5, wherein the means for taking up the video cable comprises stationary pulley means for carrying a portion of the video cable and movable pulley means for carrying another portion of the video cable, including means for moving the movable pulley means away from the stationary pulley means when the extendable camera mast is raised.

8. The apparatus of claim 2 further comprising:

a video cable connected to the camera for transmitting video signals from the camera; and means for taking up the video cable when the extendable camera is raised, wherein the means for taking up the video cable comprises a stationary pulley fixedly mounted in relation to the stationary camera mast and a movable pulley slidably mounted on the stationary camera mast, and wherein the video cable is reeved around the stationary and movable pulleys.

9. The apparatus of claim 8, wherein the stationary camera mast comprises a track running substantially parallel with the longitudinal axis of the stationary camera mast, and the movable pulley is slidingly engaged within the track.

10. The apparatus of claim 1, wherein the means for raising and lowering the extendable camera mast comprises a lift cable fastened to an upper portion of the extendable camera mast and a winch for winding up the lift cable.

11. The apparatus of claim 1, further comprising loading guide means operatively connected with the refueling mast for facilitating placement of fuel assemblies in the reactor vessel.

12. The apparatus of claim 11, wherein the loading guide means comprises a fuel assembly guide member mounted on a loading guide mast which is telescopingly mounted on the camera mast assembly.

13. The apparatus of claim 12, wherein the loading guide mast is telescopingly mounted co-axially within the extendable camera mast.

14. An apparatus for inspecting a nuclear reactor vessel comprising:

a refueling mast;

a camera mast assembly rotatably mounted on a peripheral surface of the refueling mast comprising an extendable camera mast;

a camera supported by the extendable camera mast; and means for raising and lowering the extendable camera mast.

15. An apparatus for inspecting a nuclear reactor vessel comprising:

a refueling mast;

a camera mast assembly mounted on a peripheral surface of the refueling mast comprising an extendable camera mast;

a camera supported by the extendable camera mast;

means for raising and lowering the extendable camera mast;

a video cable connected to the camera for transmitting video signals from the camera; and means for taking up the video cable when the extendable camera mast is raised, comprising a stationary pulley means for carrying a portion of the video cable and movable pulley means for carrying another portion of the video cable, including means for moving the movable pulley means away from the stationary pulley means when the extendable camera mast is raised.

16. An apparatus for inspecting a nuclear reactor vessel comprising:

a refueling mast;

a camera mast assembly comprising a stationary camera mast mounted on a peripheral surface of the refueling mast and an extendable camera mast;

a camera supported by the extendable camera mast;

means for raising and lowering the extendable camera mast;

a video cable connected to the camera for transmitting video signals from the camera; and means for taking up the video cable when the extendable camera is raised, wherein the means for taking up the video cable comprises a stationary pulley fixedly mounted in relation to the stationary camera mast and a movable pulley slidably mounted on the stationary camera mast, and wherein the video cable is reeved around the stationary and movable pulleys.

17. The apparatus of claim 16, wherein the stationary camera mast comprises a track running substantially parallel with the longitudinal axis of the stationary camera mast, and the movable pulley is slidingly engaged within the track.

18. An apparatus for inspecting a nuclear reactor vessel comprising:

a refueling mast;

a camera mast assembly mounted on a peripheral surface of the refueling mast comprising an extendable camera mast;

a camera supported by the extendable camera mast;

means for raising and lowering the extendable camera mast; and loading guide means, comprising a fuel assembly guide member mounted on a loading guide mast which is telescopingly mounted on the camera mast assembly, operatively connected with the refueling mast for facilitating placement of fuel assemblies in the reactor vessel.

19. The apparatus of claim 18, wherein the loading guide mast is telescopingly mounted co-axially within the extendable camera mast.

* * * * *